US006310882B1

(12) United States Patent
Lorenz et al.

(10) Patent No.: US 6,310,882 B1
(45) Date of Patent: Oct. 30, 2001

(54) HIGH SPEED SWITCH ARCHITECTURE USING SEPARATE TRANSMIT AND RECEIVE CHANNELS WITH INDEPENDENT FORWARDING TABLES

(75) Inventors: Gary D. Lorenz, Acton, MA (US); Bruce W. Thompson, Mount Vernon, NH (US); Harsh Kapoor, Boxboro, MA (US); Charles R. Weaver, Leominster, MA (US); Brian J. Myrick, Boxboro, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/238,880

(22) Filed: Jan. 27, 1999

(51) Int. Cl.[7] .................................................. H04L 12/46
(52) U.S. Cl. ......................................... 370/401; 370/428
(58) Field of Search .................................. 370/401, 402, 370/407, 428, 420, 421

(56) References Cited

U.S. PATENT DOCUMENTS

| | | | |
|---|---|---|---|
| 5,311,593 | * | 5/1994 | Carmi ........................................ 380/23 |
| 5,319,644 | * | 6/1994 | Liang ................................. 340/825.07 |
| 5,537,099 | * | 7/1996 | Liang ................................. 340/825.07 |
| 5,684,959 | * | 11/1997 | Bhat et al. ........................ 395/200.11 |

* cited by examiner

Primary Examiner—Douglas Olms
Assistant Examiner—Ken Vanderpuye
(74) Attorney, Agent, or Firm—McGlew and Tuttle, P.C.

(57) ABSTRACT

A switching architecture for very high data rates which is placed between a port connecting to a fiber optic gigabit ethernet link and a two Gbit/sec backplane of a concentrator. A port connects to the link for both receiving and transmitting data packets from and to the link. A first FTE receives a data packet from the port, and analyzes the data packet to determine if the data packet should be forwarded to the backplane of the concentrator. If the data packet is to be forwarded, the first FTE sends the data packet to a backplane connection for connecting to the backplane of the network concentrator. A second FTE is connected to the backplane connection. The second FTE receives a data packet from the backplane connection, and analyzes the data packet in a manner similar to the first FTE to determine if a packet should be forwarded to the port. The process of the second FTE with regard to the data packets is substantially similar to the process of the first FTE, except that it is determined whether or not the data packets from the backplane should be forwarded to the port. This switch architecture therefore uses separate transmit and receive channels with independent forwarding tables. The first and second FTE's can be substantially identical, and are preferably switch engine ASIC's (Application Specific Integrated Circuit) designed for a lower data rate.

7 Claims, 3 Drawing Sheets

HIGH SPEED SWITCH ARCHITECTURE USING SEPARATE TRANSMIT AND RECEIVE CHANNELS WITH INDEPENDENT FORWARDING TABLES

FIELD OF THE INVENTION

The present invention relates in general to a switching device for very high data rates, and more specifically to a fiber optic media module in a computer network concentrator.

BACKGROUND OF THE INVENTION

A network concentrator contains a plurality of modules connecting together a plurality of stations. These modules can be roughly divided into management modules and communication or media modules. The media modules connect to links which in turn connect to individual stations or to other concentrators. The management modules control the operation of the media modules and the interaction between the communication modules.

A media modules perform the actual transferring of data in a computer network. Data received on one link of a concentrator can be sent out on another link of a concentrator in order to transfer data between two stations in a computer network. A network concentrator can have a plurality of media modules, and each media module can have one or more ports for connecting to one or more links. Data can enter into a media module on one port, and then be sent out on another port of the same media module, or the media module can send that data to the backplane of a concentrator where the data is sent to another media module, and then the data is sent out on a port of the another media module. The media modules have a switch engine which analyzes incoming data and determines if the data should be sent out on one of the other ports of a media module, or be placed onto the backplane of the concentrator. The switch engine of a media module also listens to the backplane, and determines if any of the data on the backplane should be received and forwarded to one of the ports of the respective media module.

As the number of stations connected together in a computer network grows, as computer applications grow to transfer larger and larger amounts of data, such as audio and video, and as computer networks spread physically further apart, there is a great need for a single link to transfer data at very high rates.

The present invention anticipates that hundreds, maybe thousands of users at one location will want to exchange data, especially audio and video data with hundreds or possibly thousands of users at another location spaced relatively far from the first location. The high data rates needed to timely transfer the information from one location to another will require fast processing of the data at each location to deliver the data to its proper station. The high data rate possible over links between two locations is often much higher than economically possible data processing rates at each end of the link.

SUMMARY AND OBJECTS OF THE INVENTION

It is the primary object of the present invention to provide data processing at the end of a link which is comparable to the high data rates available in a fiber optic link and the backplane of a concentrator, while still being economical relative to the backplane and the fiber optic link.

The present invention accomplishes this object by a switching architecture which is placed between a port connecting to a fiber optic gigabit ethernet link and a 2 Gbit/sec backplane of a concentrator. A port means connects to the link for both receiving and transmitting data packets from and to the link. The port means has a concentrator side input for receiving data packets to be transmitted onto the link. The port means also has a concentrator side output for delivering data packets received from the link. A first forwarding and translating engine (FTE) has an input and an output. The input of the first FTE is connected to the concentrator side output of the port means. The first FTE receives a data packet from the port means, and analyzes the data packet to determine if the data packet should be forwarded to the backplane of the concentrator. The first FTE ignores the data packet if the data packet is not to be forwarded. If the data packet is to be forwarded, the first FTE sends the data packet out onto the output of the first FTE, and performs any modifications or translation of the data packet according to the protocol of the backplane. The first FTE includes an address forwarding database for indicating what type of data packets are to be forwarded, and how they are to be translated or modified. In particular, the first FTE reads the destination address of a packet and consults the address forwarding database means to determine if that destination address can be reached through the backplane. If the address database means determines that the destination address can be reached through the backplane, the FTE forwards the data packet through the backplane. The first FTE, also analyzes the source address of a packet received from the port, to determine which addresses can be reached through the port. The output of the first FTE is sent to a backplane connection means for connecting to the backplane of the network concentrator, and for both receiving and transmitting data packets from and to the backplane. The backplane connection means has a port side input connected to the output of the first FTE, and for receiving data packets to be transmitted onto the backplane. The backplane connection means also has a port side output means for delivering data packets received from the backplane.

A second FTE has an input and an output. The input of a second FTE is connected to the port side output of the backplane connection means. The second FTE receives a data packet from the backplane connection means, and analyzes the data packet in a manner similar to the first FTE to determine if a packet should be forwarded to the port. The process of the second FTE with regard to the data packets is substantially similar to the process of the first FTE, except that it is determined whether or not the data packets from the backplane should be forwarded to the port.

This switch architecture therefore uses separate transmit and receive channels with independent forwarding tables. The first and second FTE's can be substantially identical, and are preferably switch engine ASIC's (Application Specific Integrated Circuit). Each switch engine ASIC has an associated memory for packet memory and look-up memory. The memories associated with each ASIC are each independent and are able to store forwarding information for addresses independently, or they can be programmed with the same address forwarding database. This architecture produces the bandwidth between the switching ASIC's, and the two associated memories by half of the total system requirement. This architecture is optimized for a single port gigabit ethernet switch in a multifunction hub. The switching ASIC devices are preferably identical and are devices where each device would be used alone in a switch architecture for a lower speed, such as 10Mbit ethernet applications. This provides a switch architecture for gigabit applications, where a switch engine does not need to be especially designed for the new high data rate, but two lower speed switch engines are combined to handle the new high data rate.

The port means preferably includes means for transmitting and receiving data packets to and from the link at substantially 1,000 Mb/s and the first and second FTE operate at substantially 25 MHZ. The backplane connection means transmits and receives data packets to and from the backplane of the concentrator at 2 Gbit/sec, and the port input and output of the backplane connection means provides 32 bit full duplex 25 MHz interfaces and transfers the data packets at 800 Mbit/sec to the first and second FTE means.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
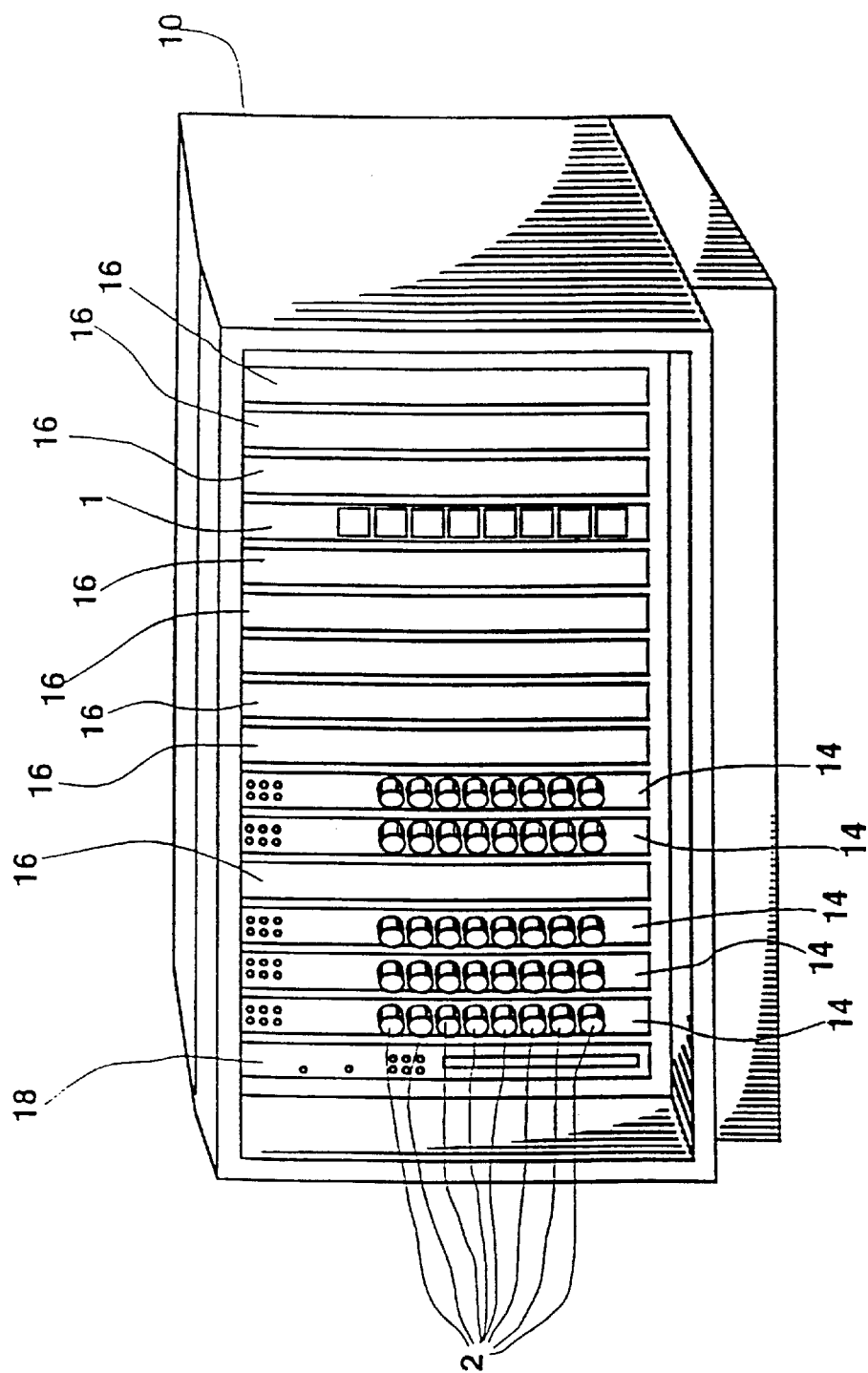
FIG. 1 is a perspective view of a computer network concentrator.
Figure 2:
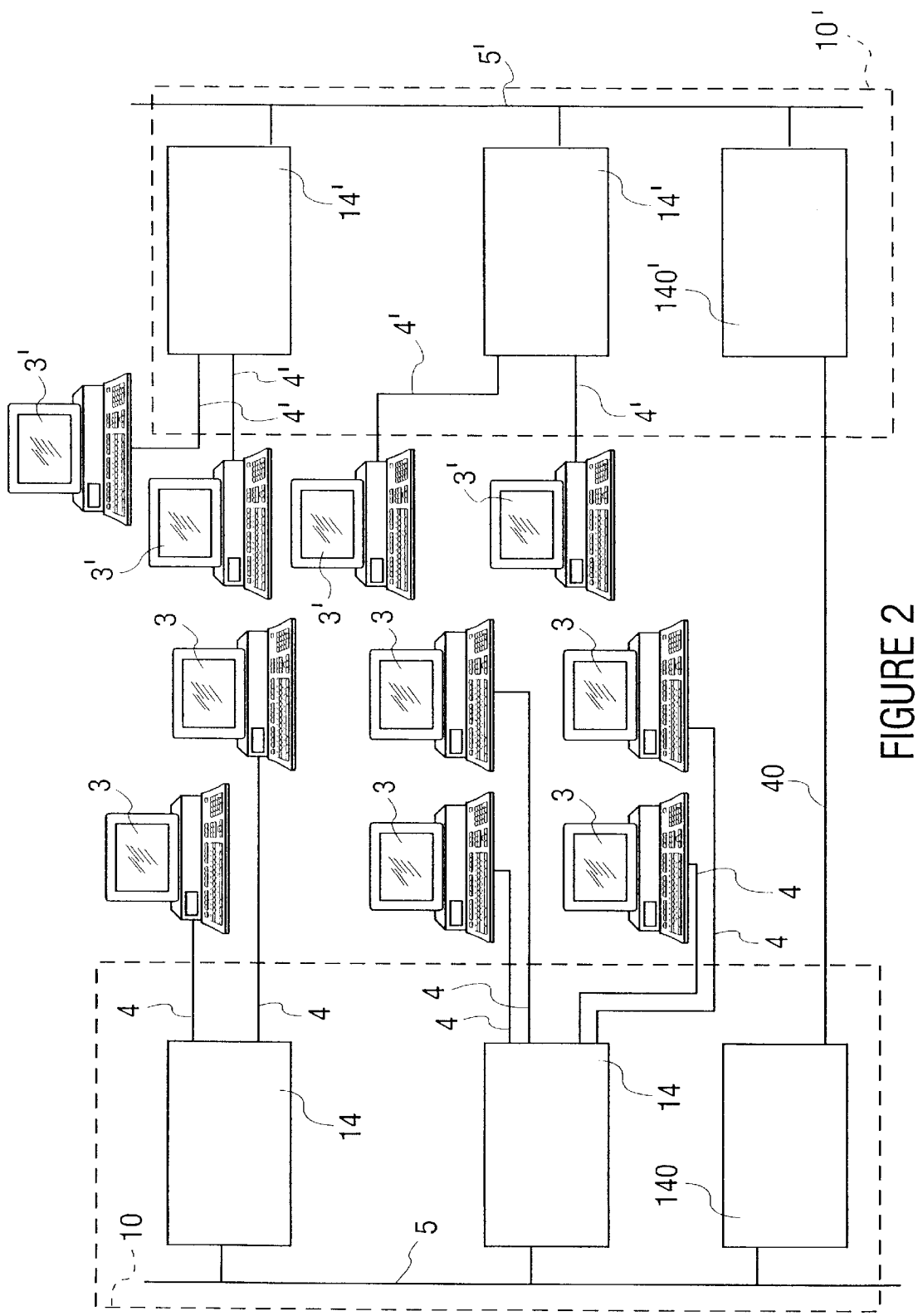
FIG. 2 is a schematic diagram of two concentrators connected by a high speed link.

Referring to the drawings, and in particular to FIG. 1, a concentrator 10 has a plurality of slots 16 which can be filled with modules such as media modules 14, and management module 1, and a power supply module 18. As shown in FIG. 2, a plurality of stations 3 can be connected to a media module 14 by links 4. The stations 3 can communicate with other stations connected to the same media module 14, or a station 3 can connect to another station 3 on a different media module 14 over the backplane 5 of the concentrator 10.

FIG. 2 also shows another concentrator 10' with a plurality of media modules 14' connected by a backplane 5'. The concentrator 10' connects a plurality of stations 3' with each other. A high speed media module 140 in concentrator 10 has a high speed link 40 connecting it to another high speed media module 140' in concentrator 10'. Stations 3 are able to communicate with stations 3' through the high speed link 40, the high speed media modules 140, 140' and backplanes 5 and 5'. The high speed link 40 is preferably a single-mode fiber optic gigabit/second ethernet link.

Figure 3:
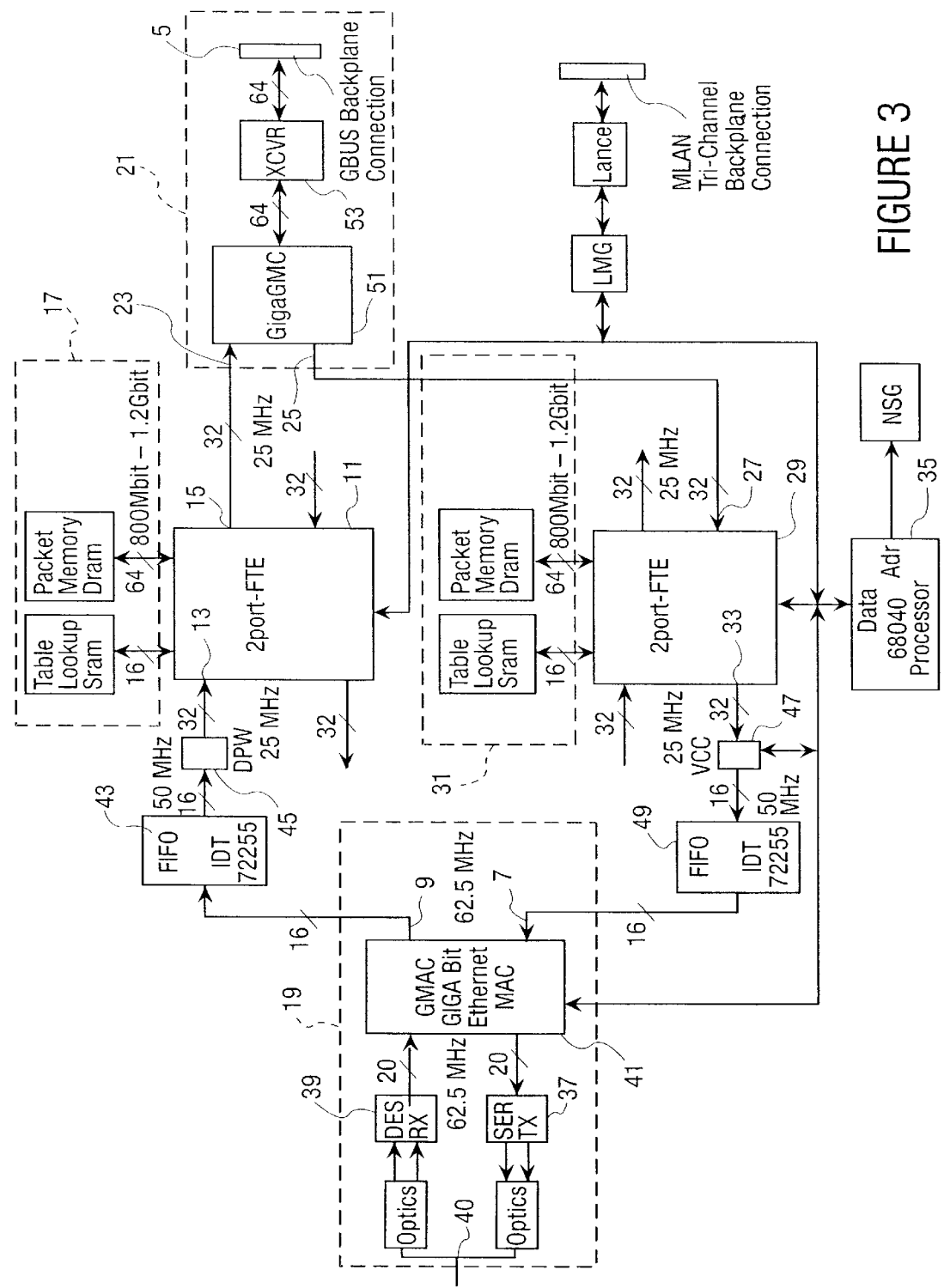
FIG. 3 is a schematic diagram of the switch architecture between a fiber optic port means and a backplane connection.

FIG. 3 shows the switch architecture inside high speed media modules 140, 140'. A port means 19 connects to high speed link 40 for receiving and transmitting data packets from and to the link 40. The port means 19 also has a concentrator side input 7 and a concentrator side output 9. The concentrator side input receives data packets to be transmitted onto the link 40, and the concentrator side output 9 delivers data packets received from the link 40. The port means 19, operates the link 40 in full duplex mode only at a data rate of 100 Mb/s using single-mode fiber for high speed link 40. A first forwarding and translating engine (FTE) means has an input 13 and an output 15. The input 13 of the first FTE means 11 is connected to the output 9 of the port means 19. The first FTE means 11 receives data packets from the port means 19, and analyzes the data packet to determine if the data packet should be forwarded to the backplane 5. If the first FTE means 11 determines that the data packet is not to be forwarded to the backplane 5, the first FTE means 11 ignores and effectively destroys the data packet in the first FTE means 11. However, if the first FTE means 11 determines that the packet should be forwarded, the packet is transferred out on output 15, with any modifications that may be needed for the backplane protocol. An address forwarding database means 17 indicates which data packets are to be forwarded, usually based on the destination address of the packet. Address forwarding database means 17 can also be updated with source addresses of the data packets to determine which source addresses are available from the port means 19.

Data packets leave output 15 of the first FTE means 11 and are received at a port side input 23 of a backplane connection means 21. The port side input 23 receives data packets to be transmitted on to the backplane 5. The backplane connection means 21 also has a port side output means 25 for delivering data packets received from the backplane 5 to an input 27 of a second FTE means 29. The second FTE means 29 operates similar to the first FTE means 11, but in the reverse direction with regard to packets traveling from the backplane 5 to the high speed link 40. Data packets are analyzed with respect to address forwarding data base means 31 and are sent out on output 33 of the second FTE means 29. The output 33 delivers the packets to the concentrator side input 7 of port means 19 where the packet is there transferred onto the high speed link 40. A processor subsystem 35 coordinates the operation of the first and second FTE means 11, 29, the port means 19 and the backplane connection means 21. The processor subsystem 35 also contains address synchronizing means for synchronizing data in the address forwarding database means 17, 31 of the first and second FTE means 11, 27. In this way the location of addresses learned by one FTE means can be transferred to the other FTE means to determine if data packets should be forwarded.

The port means 19 includes a serializer 37 which serializes data packets from the second FTE means 29. A deserializer 39 converts data packets received from the high speed link 40 in serial form to parallel form. The serializer and deserializer preferably utilize a 20 bit interface and a 62.5 MHz clock which is provided by a local oscillator. The deserializer 39 provides a differential clock and a 20 bit data word to the media access control means 41. The serializer 37 sources a differential clock which the media access control (MAC) uses to provide synchronous transmit data. The MAC 41 interfaces to the serializer 37 and deserializer 39 with independent receive and transmit paths. The MAC preferably operates in full duplex mode only. The MAC 41 is responsible for transmission and recognition of IEEE standard 802.3 X flow control frames.

First In First Out (FIFO) are used to buffer data between the port means 19 and the first and second FTE means 11, 29. The MAC device 41 preferably has a one gigabit per second interface and the FTE means preferably have an 800 megabit per second interface. A data path widener (DPW) 45 converts the 50 megahertz, 16 bit databus from the FIFO 43 to a 25 MHz, 32 bit databus that is connected to the first FTE means 11. A VLAN transmit chip 47 converts the 25 MHz, 32 bit transmit databus from the second FTE means 29 to a 50 megahertz 16 databus to be transmitted to the transmit FIFO 49. The VLAN transmit chip will also convert the 8 bit VLAN field within a IEEE 802.1 Q tag packet to a 12 bit field via a programmable table look-up.

The first and second FTE means 11, 27 are preferably multi-input and multi-output switch engines which are used singularly in lower speed switches. For the high speed media module, only one input and one output are used where the inputs and outputs have been changed from 16 bits to 32 bits. The FTE means also includes support for IEEE 802.1 Q VLAN tagging, table look-up, packet memory and processor interfaces. The first and second FTE means 11, 29 perform all frame forwarding, frame format translation and filtering.

When a packet is received by the FTE means 11, 29, and if VLAN Tagging is enabled in both the Receive Control register (i.e. bit 14 is set) and the Receive Lookup Control register is enabled (i.e. bit 6 is set) then the FTE means 11, 29 will parse the frame to determine whether the packet contains a VLAN Tag. The four types of packets which may be received on this interface are shown below.

```
Tagged Ethernet Packet
DA(47:0)   SA(47:0)   TagType(15:0)   Vlan Pri(15:13) &      Type(15:0)   Rest of
                                       '0', & VlanID(11:0)                packet
Untagged Ethernet Packet
DA(47:0)   SA(47:0)   Type(15:0)    Rest of packet
Tagged 8702.3 Packet
DA         SA         Tagtype      Vlan      802.3     Dsap     Ssap     Ctl      Rest
(47:0)     (47:0)     (15:0)       Pri       Length    (7:0)    (7:0)    (7:0)    of
                                   (15:13)   (7:0)                                packet
                                   & '0',
                                   & Vlan
                                   ID
                                   (11:0)
Untagged 802.3 Packet
DA(47:0)   SA(47:0)   802.3         Dsap(7:0)   Ssap(7:0)   Ctl(7:0)   Rest of packet
                      Length(7:0)
```

In each of these frame types, the FTE means 11, 29 compares the 2 bytes immediately following the SA with the VLAN Tay Type value in the Receive Control register (bits 31 to 16). If there is a match then the GigaFTE treats the packet a VLAN Tagged packet.

The GigaFTE will use the VLAN Tag Priority in the packet to determine whether the frame should be put on the high priority queue. The VLAN Tag Priority is also written into packet Header bits 41 to 39.

The backplane connection means 21 includes a multiplexer chip 51 providing separate channels for both transmit and receive between the FTE means 11, 29 and the backplane bus 5. The multiplexer chip uses internal dual ported rams configured to work similar to FIFO's to buffer packets being transmitted and received. The multiplexer chip provides a 32 bit full duplex 25 MHz interface to the FTE means 11, 29 and transfers data at the rate of 800 Mbits/sec on receive and on transmit. The multiplexer chip 51 also has a synchronous processor interface oriented towards the processor subsystem 35. A transceiver 53 is positioned between the multiplexer chip 51 and the backplane bus 5.

While specific embodiments of the invention have been shown and described in detail to illustrate the application of the principles of the invention, it will be understood that the invention may be embodied otherwise without departing from such principles.

What is claimed is:

1. A network media module of a computer network concentrator, the module comprising:
    a port means for connection to a link and for both receiving and transmitting data packets from and to the link, said port means also having a concentrator side input for receiving data packets to be transmitted onto the link, said port means also having a concentrator side output for delivering data packets received from the link;
    a first forwarding and translating engine (FTE) means having an input and an output, said input of said first FTE means being connected to said concentrator side output of said port means, said first FTE means receiving a data packet from said port means, analyzing the data packet, determining if the data packet should be forwarded, ignoring the data packet if the data packet is not to be forwarded, and sending the data packet out said output of said first FTE means if the data packet is to be forwarded, said first FTE means including an address forwarding data base means for indicating which data packets are to be forwarded;
    backplane connection means for connecting to a backplane of the network concentrator and for both receiving and transmitting data packets from and to the backplane, said backplane connection means also having a port side input connected to said output of said first FTE means and for receiving data packets to be transmitted onto the backplane, said backplane connection means also having a port side output means for delivering data packets received from the backplane;
    a second forwarding and translating engine (FTE) means having an input and an output, said input of said second FTE means being connected to said port side output of said backplane connection means, said second FTE means receiving a data packet from said backplane connection means, analyzing the data packet, determining if the data packet should be forwarded, ignoring the data packet if the data packet is not to be forwarded, and sending the data packet out said output of said second FTE means if the data packet is to be forwarded, said output of said second FTE means being connected to said concentrator side input of said port means, said second FTE means including an address forwarding data base means for indicating which data packets are to be forwarded.

2. A module in accordance with claim 1, further comprising;
    address synchronizing means for synchronizing data in said address forwarding data base means of said first and second FTE means.

3. A module in accordance with claim 1, wherein:

said port means includes fiber optic connection means for connecting to a fiber optic gigabit/sec ethernet link.

4. A module in accordance with claim 1, wherein:

said port means includes a deserializer for deserializing data packets received from the link;

said port means includes a serializer for serializing data packets to be transmitted onto the link;

said port means includes a media access control (MAC) means for controlling movement of data packets onto and from the link, said MAC means operating in full duplex mode, said MAC means generating and analyzing IEEE Standard 802.3x flow control frames.

5. A module in accordance with claim 1, wherein:

said port means includes means for transmitting and receiving data packets to and from the link at substantially 1000 Mb/s;

said first and second FTE means operate at substantially 25 MHz;

said backplane connection means transmits and receives data packets to and from a 2 Gbit/sec backplane of the concentrator;

said port input and output of said back plane connection means provides 32 bit full duplex 25 MHz interfaces and transfers the data packets at 800 Mbits/sec to said first and second FTE means.

6. A module in accordance with claim 1, wherein:

said first and second FTE means include another input and another output;

said first and second FTE means include support for IEEE standard 802.1q VLAN tagging;

said first and second FTE means also perform frame forwarding, frame format translation and filtering.

7. A module in accordance with claim 1, wherein:

said backplane connection means includes multiplexer chip means for providing separate channels for both transmit and receive between said first and second FTE means and the backplane;

said port input and output of said back plane connection means provides 32 bit full duplex 25 MHz interfaces and transfers the data packets at 800 Mbits/sec to said first and second FTE means.

* * * * *